United States Patent [19]

Malmros

[11] 4,229,135

[45] Oct. 21, 1980

[54] STORAGE SYSTEM INCLUDING MOVABLE PALLET RACKS

[75] Inventor: Carl-Henrik B. S. Malmros, Amal, Sweden

[73] Assignee: Aktiebolaget Electrolux, Stockholm, Sweden

[21] Appl. No.: 880,011

[22] Filed: Feb. 21, 1978

[30] Foreign Application Priority Data

Feb. 18, 1977 [SE] Sweden .................................. 7701824

[51] Int. Cl.³ ........................... B65G 1/06; B65G 1/10
[52] U.S. Cl. .................................... 414/284; 312/198; 414/331
[58] Field of Search ............ 214/16 B, 16.4 A, 16.4 B; 191/1 R; 105/146, 147; 312/198; 414/284, 279, 281, 282, 331, 277

[56] References Cited

U.S. PATENT DOCUMENTS

| | | | |
|---|---|---|---|
| 3,606,839 | 9/1971 | Stafford et al. ................... | 105/147 X |
| 3,719,288 | 3/1973 | Schmitt et al. ............. | 214/16.4 A X |
| 3,865,446 | 2/1975 | Mastronardi ................... | 214/16 B X |
| 3,869,028 | 3/1975 | Sawada et al. ...................... | 191/1 R |
| 3,905,492 | 9/1975 | Maeda ............................. | 214/16.4 B |
| 3,977,542 | 8/1976 | Stolzer ............................ | 214/16.4 A |

Primary Examiner—Stephen G. Kunin
Assistant Examiner—Edmond G. Rishell, Jr.
Attorney, Agent, or Firm—Alfred E. Miller

[57] ABSTRACT

In a storage system, a plurality of storage racks are provided, the racks being movable to enable selection of passageways therebetween. A carriage is conveyable along the ends of the racks by individual conveyors supported at the rack ends, the carriage being movable into passageways formed between the racks. The racks or carriages supporting the racks are provided with rails mounted to support the movable carriage when it is positioned in any selected passageway. A fork lift device is provided on the carriage to enable selection of a vertical position in the racks.

3 Claims, 4 Drawing Figures

U.S. Patent     Oct. 21, 1980     4,229,135
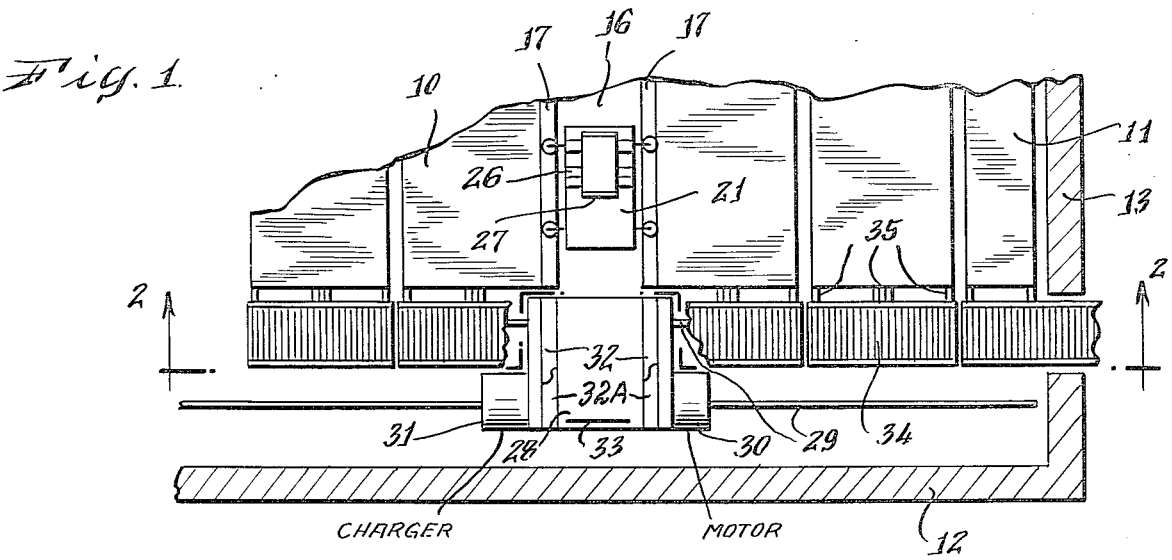
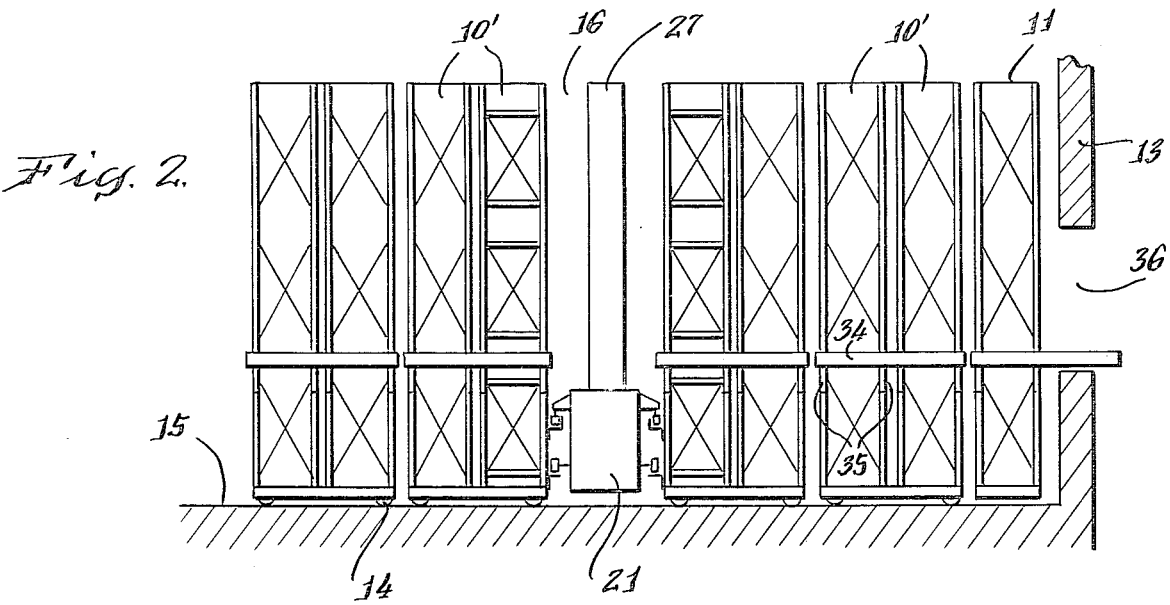
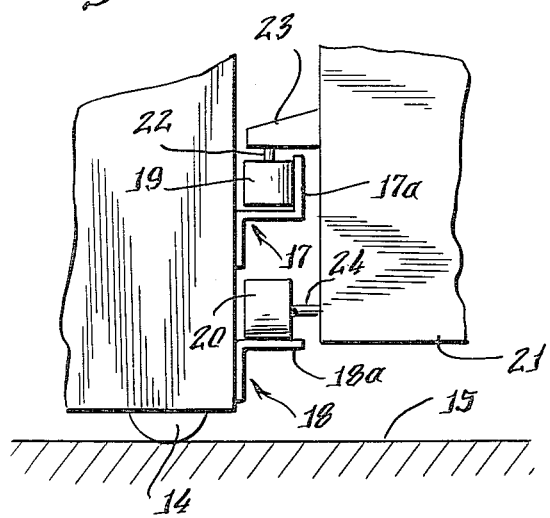
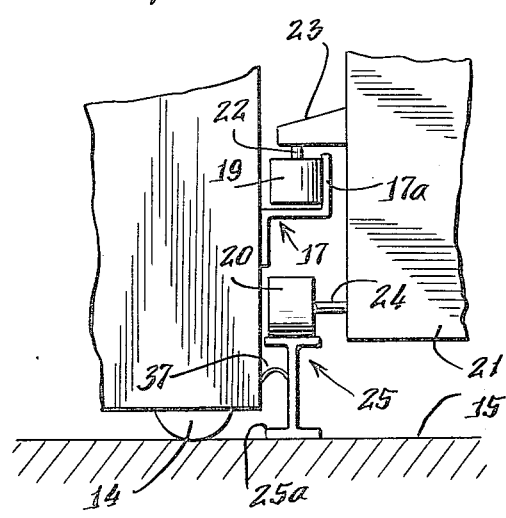

STORAGE SYSTEM INCLUDING MOVABLE PALLET RACKS

BACKGROUND OF THE INVENTION

This invention relates to a storage system including several aligned pallet racks which are movable forward and backward in a direction parallel to the row of racks so as to form a passageway between two selected racks situated adjacent to one another. In this type of system, a carriage is arranged for depositing and removing articles in pallets, the carriage having at least one fork lift. The fork lift can be raised and lowered, and is movable horizontally forward and backward. The carriage can be moved between a position outside the passageway and the selected position in the passageway, the outside position preferably being on a transfer carriage movable along the row of racks to a selected passageway.

Compact storage structures in which racks supported by wheels and having shelves are placed in a row, and are movable to form a passageway between two selected adjacent racks, are well known. These racks are either manually movable or each rack can for example have an electric reversible motor for moving the rack in the desired direction. The control of the movement of the racks can be more or less automatic.

The principles of compact storing in connection with storage systems of shelf racks are nowadays employed also for pallet racks. Thus, several double racks, i.e. two single racks placed with their backs facing one another, are disposed in a row beside each other so that the racks are normally close together, space being provided for one passageway to exist somewhere between two racks. This enables the rack locations on either side of the passageway to be accessible. Manually controlled, electrically operated fork trucks have been used to deposit and remove articles in this type of system. A disadvantage with trucks of this type is that the passageway must be relatively broad so that the truck can be turned through 90° when articles are to be placed in or taken out of the racks. Another disadvantage of such systems is that guide rails for the trucks are required in certain cases, for instance when the racks are used in a warehouse for storing frozen food, and it is desired to substitute an automatically operated truck for a manually operated truck. These additional guide rails will inconveniently cross the rails normally arranged in the floor to guide the movement of the racks. Furthermore, when employing manually operated trucks it is necessary to place the guide rails for the movement of the racks below the floor surface to permit unimpeded movement of the truck into and out of the passageway.

SUMMARY OF THE INVENTION

The invention is directed to the provision of a system which avoids the above drawbacks and disadvantages.

Briefly as stated, in accordance with the invention, the above objective is achieved by providing a storage system wherein the rails for supporting and/or guiding the carriage are mounted directly on the racks, or on movable carriages supporting the racks. In various embodiments of the invention, the guiding and supporting functions may be performed by separate rails, or by a common rail. If desired, support rails may be merely held by the corresponding racks or carriages thereunder, so that when these rails are loaded by the passage of a transport carriage, they may engage the floor. This of course reduces the required load carrying capacity of the support rails.

In further embodiments of the invention, separate conveying means are provided on the ends of each rack, with the conveying means of any contiguous row of racks thereby providing a complete conveyor system leading to a selected passageway between a pair of spaced apart racks. This arrangement minimizes the space required for transporting articles to the transfer carriage.

BRIEF FIGURE DESCRIPTION

In order that the invention will be more clearly understood, it will now be disclosed in greater detail with reference to the accompanying drawing, wherein:

FIG. 1 is a simplified top view of a storage system in accordance with the invention with parts broken away for clarity;

FIG. 2 is a simplified cross-sectional view of the system of FIG. 1, taken along the lines II—II of FIG. 1;

FIG. 3 is an enlarged partially cross-sectional view of a guiding beam system for the arrangements of FIGS. 1 and 2, and FIG. 4 is an enlarged view of a modification of the guide system illustrated in FIG. 3.

DETAILED DISCLOSURE OF THE INVENTION

FIG. 1 shows a pallet rack storage system comprising several movable racks 10 and a stationary rack 11. The storage system may be accommodated in a building, for example a storage warehouse for frozen food, with walls 12, 13. The movable racks 10 are of the double type, i.e. including two single racks 10' with their backs facing one another as shown in FIG. 2. Each movable rack has several wheels 14 coacting with a floor 15. The wheels 14 are disposed in pairs and at least one pair in each rack is preferably guided by rails (not shown) in the floor 15. At least one wheel 14 in each rack 10 is driven by an electric motor (not shown). The motor is reversible so that the racks can be moved in opposite directions to form a passageway 16 between two selected racks 10. As an alternative, two motors can be provided for each rack, one for each direction of movement. The mounting and location of the motors may be conventional.

According to the invention the racks 10 have horizontal guide beams 17, 18 affixed to their sides to coact with wheels 19, 20 on a carriage 21, for placing articles in the racks or removing articles from the racks, as more clearly shown in FIG. 3. The wheels 19, which form a group of four wheels, are disposed on an upper level in the carriage 21 and coact with a vertical guiding edge 17a of the beam 17. For this purpose the wheels are rotatably mounted on vertical shafts 22 supported by brackets 23 on the sides of the carriage. In addition, wheels 20 form a group of four wheels mounted on a lower level in the carriage 21. The wheels 20 are rotatably mounted on horizontal shafts 24 and coact with a horizontal part 18a of the beam 18. Various alternative designs of the beams 17, 18 are possible. FIG. 3 shows to an enlarged scale the design appearing in FIGS. 1 and 2. FIG. 4 shows an alternative design, in which the beam 18 is replaced by a beam 25 which is resiliently supported by the rack, for example by a spring 37 (diagrammatically shown). The beam is I-shaped and its bottom flange 25a rests on the floor 15 when the carriage 21 has a load. As an alternative the bottom flange 25a can rest on rails (not shown) positioned to guide the racks on the floor when such rails are used. When the carriage 21 does not load the guide beam 25, the latter will be situated above the floor and the floor rail, respectively, so that the movement of the rack is not obstructed. The spring 37 is only diagrammatically shown, and it will be apparent that any conventional means may be employed for resiliently supporting the guide beam 25 so that it will normally be in a position raised above the floor, but will be lowered resiliently to engage the floor or rails thereunder either under the combined weight of articles and the carriage, or the carriage 21 alone. Alternatively, the racks can be disposed on carriages which may be designed to support the guide beams 17, 18. In the present disclosure it will thereby be evident that reference to the affixing of the guide beams to the racks also refers to the alternative arrangements wherein one or more of the guide beams may be actually physically mounted upon a carriage or the like beneath the racks.

The carriage 21 has a fork lift 26, as shown in FIG. 1, for placing articles in pallets in a selected location in the rack, or remove them therefrom. The fork lift can be raised and lowered along an upright member 27. The fork lift is also telescopic and can be moved horizontally between a position on the carriage 21 and a location in the rack. In other words, the fork lift may be provided with telescopic arms that can be extended into the racks to pick up or deposit articles, and to move such articles to a position over the carriage 21 when the carriage is being moved in a selected passageway. The fork lift 26 and the carriage 21 are driven along the guide beams 17, 18 in the passageway 16 by motors (not shown) which are powered by chargeable batteries (not shown) disposed, for example, in the carriage. The carriage 21 can assume a position on a transfer carriage 28 for moving the carriage 21 laterally to a selected passageway 16. The transfer carriage is guided by rails 29 in the floor 15 and is driven by an electric motor 30. On the transfer carriage 28 is also a charging device 31, which may be connected to the batteries by conventional techniques for charging them as soon as the carriage 21 is on the transfer carriage 28. Beams 32, shown partially broken away in FIG. 1, corresponding to the beams 17 are provided on the transfer carriage 28 to guide the carriage 21, and similar guide beams 32A corresponding to the beams 18 are also provided on the carriage 28. In order to indicate the position for the carriage 21 when it is fully on the transfer carriage 28, a stop 33 is provided on the carriage 28.

At the end of each rack 10, 11 facing the transfer carriage 28 the rack in accordance with the invention has a rollerway portion 34 secured to the rack by brackets 35. The individual rollerway portions form a continuous rollerway at both sides of any selected passageway 16. In the embodiment shown the righthand rollerway is used for conveying articles through an opening 36 in the wall 13 from the storage. The articles can be supplied to the storage for example by being assembled at a position which can be reached by the transfer carriage 28. Alternatively, articles can be conveyed to the carriage 21 via the rollerway at the left-hand side of the selected passageway 16. Suitably the two rollerways, include drive rolls for the movement of articles in the direction from the left to the right in FIGS. 1 and 2. Although in this embodiment rollerways have been chosen for conveying articles to or from the storage, it is obvious that also other types of conveyors may be employed, such as, for example chain conveyors. It is necessary, however, that the conveyor be divided into portions, each one supported by a separate rack, so as to form continuous conveyor paths at either side of any selected passageway 16.

It will of course be apparent that the rollerway sections 34 must be at a vertical height that will not interfere with either the rolling of the transfer carriage 28 along the guide rails 29, or the movement of the transfer carriage 28 along the ends of the racks. Thus, as illustrated in FIG. 2, the rollerways 34 are above the top of the carriage 21 in its lowermost position, so that an article, if desired, may be moved directly along the rollerways to a level that can be assumed by the fork lift device (not shown in FIG. 2) on the carriage 21 when the carriage 21 is positioned on the transfer carriage 28.

The carriage 21 as well as the transfer carriage 28 and the racks 10 can be operated manually or automatically. In the first case an operator on the carriage 21 may directly control the whole process of feeding and discharging by way of conventional control means on the carriage 21. In the latter case a computer or a control unit of simple type can be used to operate the feed and discharge system in accordance with conventional control techniques. The processes are effected in similar manners, whether the control is manual or automatic. Thus, a feeding process in the case of manual control is initiated by the operator when the carriage 21 is on the transfer carriage 28. When the desired location in the rack 10 or 11 has been selected the transfer carriage 28 is moved to a position corresponding to the passageway from which the location in the rack is accessible. At the same time one or more of the racks 10 are moved so as to form the thus selected passageway 16. Then a pallet with articles on the rollerway formed to the left of the selected passageway 16 by the rollerway portions 34 is conveyed to the carriage 21 on the transfer carriage 28, which is then moved into the passageway to a position right in front of the selected location in the rack. By vertical and horizontal movement of the fork lift 26 the pallet is transferred to the selected location. A pallet may be removed from a rack in a similar way, but in reverse order. Thus, the pallet is transferred from a location in the rack to the carriage 21, which conveys it as the carriage 21 is moved onto the transfer carriage 28. Then by vertical and horizontal movement of the fork lift 26, the pallet is transferred to the rollerway positioned to the right of the passageway and is then conveyed on the rollerway out of the storage through the opening 36.

By disposing the guide beams 17, 18 for the carriage 21 on the movable racks or on carriages supporting the racks according to the invention, guide rails placed below the floor surface are not necessary in the passageways. By applying the same principle to a conveyor, for example a rollerway for articles to or from the storage, the same conveyor can be used for both directions of movement. Further, since the conveyor is located close to the racks on a level above the transfer carriage, costly storage space is saved. In accordance with the invention, it is also possible to arrange rails for the racks on the floor, and thus the cost of lowering and casting of the rail in the floor is avoided.

The embodiment above described and shown in the drawing is not meant to limit the invention to any extent, the scope of the invention being determined only by the following claims. For example the wheels 19 and 20 can be positioned on the same horizontal level and coact with the guide beam 18, which in that case may be provided with a guiding edge corresponding to the guiding edge 17a. The number of wheels 19 can be less than four, for example two, and can be positioned between the wheels 20 to coact with the relevant guide beam 18.

What is claimed is:

1. In a storage system including a row of separate horizontally movable wheeled rack means arranged to permit a passageway to be formed between selected adjacent rack means, a carriage movable into and along said passageway and having a vertically movable fork lift enabling depositing articles in and removing articles from said rack means, the improvement comprising horizontal rail means affixed to the sides of said rack means, said carriage being positioned to ride on said rail means, a separate horizontal conveying means mounted at the end of each of said rack means, whereby said separate conveying means on each side of said passageway form continuous conveyors parallel to said row of rack means, and further comprising a transfer carriage movable parallel to said row of rack means at said end thereof, said transfer carriage having rail means alignable with the rail means of said rack means, whereby said first-mentioned carriage may be movable into said transfer carriage, said transfer carriage being at a level lower than said conveyor, and further including guiding means for guiding said first mentioned carriage, whereby articles may be moved to and from said fork lift by way of said conveyor.

2. The storage system of claim 1 wherein said rail means are resiliently affixed to the respective rack means, whereby said rail means under loads caused by said carriage in said passageway may engage a floor supporting said rack means, and said rail means are moved upwardly from said floor when said carriage is removed from said passageway.

3. The storage system of claim 1 wherein said rail means of said transfer carriage are below said separate conveying means, said fork lift having a vertically extending portion extending higher than the level of said separate conveying means, said rail means of said transfer carriage being spaced from said rack means a sufficient distance to enable positioning the vertically extending portion of said fork lift to the side of said conveyor means to avoid interference therewith upon lateral movement of said rack means.

* * * * *